(12) United States Patent
Nava

(10) Patent No.: US 8,262,139 B2
(45) Date of Patent: Sep. 11, 2012

(54) ROCK-DRILLING EQUIPMENT AS WELL AS FEMALE AND MALE PARTS THEREFOR

(75) Inventor: Peter Nava, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 328 days.

(21) Appl. No.: 12/596,473

(22) PCT Filed: May 28, 2008

(86) PCT No.: PCT/SE2008/000355
§ 371 (c)(1), (2), (4) Date: Nov. 3, 2009

(87) PCT Pub. No.: WO2008/150207
PCT Pub. Date: Dec. 11, 2008

(65) Prior Publication Data
US 2010/0140929 A1  Jun. 10, 2010

(30) Foreign Application Priority Data
Jun. 5, 2007 (SE) ...................................... 0701371

(51) Int. Cl.
*F16L 15/00* (2006.01)
(52) U.S. Cl. ...................................... 285/334; 285/390
(58) Field of Classification Search .................. 285/334, 285/390; 175/323
See application file for complete search history.

(56) References Cited

U.S. PATENT DOCUMENTS

| 3,388,935 | A | * | 6/1968 | Hjalsten et al. | 285/334 |
| RE27,284 | E | * | 2/1972 | Hjalsten et al. | 285/334 |
| 3,645,570 | A | * | 2/1972 | Johansson et al. | 285/334 |
| 3,717,368 | A | * | 2/1973 | Czarnecki et al. | 403/343 |
| 4,040,756 | A | * | 8/1977 | Donegan | 285/390 |
| 4,687,368 | A | * | 8/1987 | Eklof et al. | 285/334 |

(Continued)

FOREIGN PATENT DOCUMENTS

RU  2204683 C2  5/2003

(Continued)

OTHER PUBLICATIONS

RU Decision on Grant dated Apr. 12, 2012, issued in corresponding RU patent application (with English translation).

*Primary Examiner* — David E Bochna
(74) *Attorney, Agent, or Firm* — Morgan, Lewis & Bockius LLP

(57) ABSTRACT

A threaded joint interconnects male and female parts of rock-drilling equipment, the female parts including an internal trapezoidal thread in the form of a helix thread ridge, which is delimited by a top and two flanks, a groove, having a bottom, running between two tops, and which thread ridge extends a plurality of turns between a front end and a rear end, the thread top touching an imaginary cylinder or cone that is concentric with a center axis of the female part. The bottom of the thread groove has a concave and partially circular cross-section shape along at least a part of the extension of the groove, and transforms into flanks via concave radius transitions, the radii of which decrease in the direction from the front end of the thread toward the rear one, at the same time as the radius of the groove bottom increases in the same direction.

13 Claims, 4 Drawing Sheets

U.S. PATENT DOCUMENTS

Figure 1:
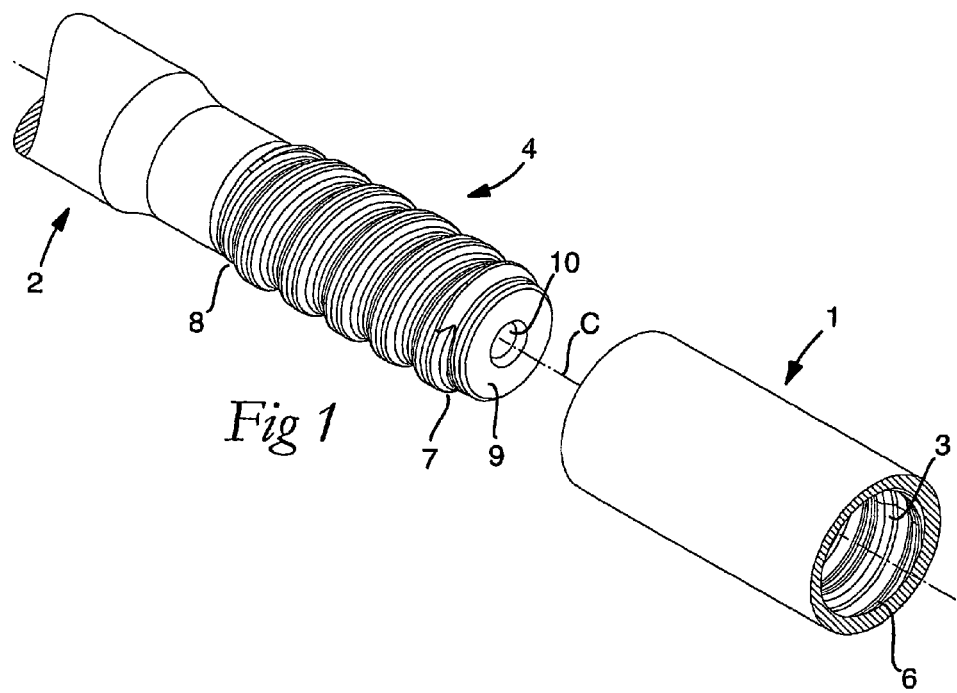

| | | | |
|---|---|---|---|
| 4,760,887 A * | 8/1988 | Jansson et al. | 403/343 |
| 4,968,068 A * | 11/1990 | Kenneth | 285/390 |
| 6,196,598 B1 * | 3/2001 | Yao | 285/333 |
| 6,293,360 B1 | 9/2001 | Liljebrand et al. | |
| 6,681,875 B2 * | 1/2004 | Larsson et al. | 285/333 |
| 8,066,307 B2 * | 11/2011 | Wahlstrom et al. | 285/334 |
| 2001/0026069 A1 | 10/2001 | Linden | |
| 2004/0195835 A1 | 10/2004 | Noel | |
| 2008/0304904 A1 | 12/2008 | Olsson | |

FOREIGN PATENT DOCUMENTS

| | | |
|---|---|---|
| RU | 2247219 C2 | 2/2005 |
| RU | 2277665 C2 | 6/2006 |
| RU | 2287659 C2 | 11/2006 |
| WO | WO 02/44512 | 6/2002 |
| WO | WO 03/042493 | 5/2003 |
| WO | WO 2004/003334 | 1/2004 |

* cited by examiner

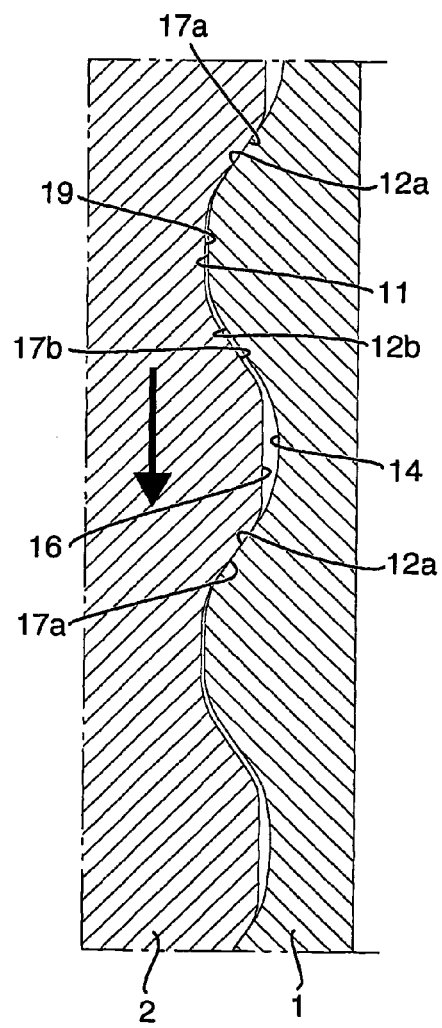
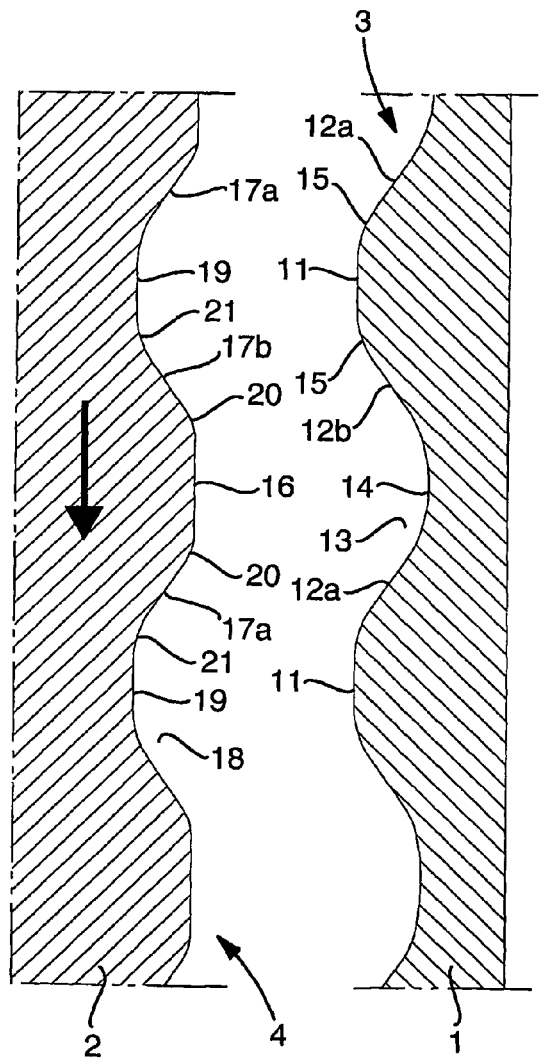
*Fig 5*  *Fig 6*

ROCK-DRILLING EQUIPMENT AS WELL AS FEMALE AND MALE PARTS THEREFOR

TECHNICAL FIELD OF THE INVENTION

In a first aspect, this invention relates to a rock-drilling equipment of the type that comprises a female part and a male part, which are connectable with each other via a threaded joint in which an internal trapezoidal thread in the female part and an external trapezoidal thread on the male part are included, each one of the threads comprising a helix thread ridge, which is delimited by a top and two flanks between which a groove having a bottom runs, and which thread ridge extends a plurality of turns between front and rear ends, said top touching an imaginary cylinder or cone that is concentric with a centre axis.

In further aspects, the invention also relates to a female part and a male part, respectively, as such.

BACKGROUND OF THE INVENTION

In practice, drilling equipments of the type generally mentioned above are used for percussive drilling or top-hammer drilling, i.e., drilling in which impact motions as well as rotary motions are transferred to a drill bit. The equipments can be assembled in most varying ways in the use of different components that are coupled together via threaded joints of different types. However, usually, the male parts consist of rods and the female parts of coupling sleeves, drill bits or reduction sleeves. In the threaded joints between the different components, frequently trapezoidal threads are preferred instead of so-called rope threads by virtue of the first-mentioned ones can be detached from each other in a considerably simpler way than the last-mentioned ones. However, a problem with trapezoidal threads is that stress concentrations arise adjacent to the concave radius transitions between the two flanks of the thread ridge and the intermediate groove bottom, which results in material fatigue and thereby reduced service life of the component in question. Such stress concentrations, which are accentuated the "sharper" angled the radius transitions are, become particularly troublesome in the female parts, in particular in the first thread turn or turns closest to the front or mouth end of the female part, where the bending loads on the female part are largest.

It is true that the problems with stress concentrations in trapezoidal threaded joints have been solved in a meritorious way by U.S. Pat. Nos. 4,040,756 and 6,196,598, viz. by forming the groove bottoms in the threads of the female part as well as of the male part with a so-called full radius profile of the same type that is found in rope threads, at the same time as the tops or crests of the threads maintain the profile shape that is typical of trapezoidal threads and defined by a straight generatrix that at opposite ends transforms into the two flanks via convex arc lines. In such a way, the flanks will transform directly into a cross-sectionally circular arc-shaped groove bottom, without any radius transitions therebetween at all. In other words, the flanks transform into a softly rounded groove bottom in which the risk of emergence of stress concentrations is minimal or non-existing.

However, a disadvantage of the threads known by said patent documents is that the thread profile is uniform along the entire axial extension of the thread between the front and rear ends. This means that the amount of material in above all the fragile female part is reduced not only in the area where bending loads are found, i.e., in the vicinity of the front mouth end of the female part, but also along the remainder of the extension of the thread up to the rear end. This material reduction impairs unnecessarily the strength and service life of the female part.

The same type of unnecessary material reduction is also found in the male part, but in this case, the same is less important than in the female part.

By U.S. Pat. No. 6,293,360, a trapezoidal thread is previously known, the profile of which successively is altered along parts of a turn. However, in this case, the profile alteration is limited to the exit or entrance of the thread, while the rest of the profile is identical along all turns between the entrance and exit.

OBJECTS AND FEATURES OF THE INVENTION

The present invention aims at obviating the above-mentioned shortcomings of previously known rock-drilling equipment and at providing an improved equipment. Therefore, a primary object of the invention is to provide a rock-drilling equipment, the female and male parts of which can be coupled together via threaded joints that, on one hand, are not subjected to local stress concentrations that may cause material fatigue, and that, on the other hand, ensure that the threads can be formed without weakening the respective parts by unnecessary material reduction. In particular, the invention aims at providing a female part having optimum strength and service life not only as a consequence of the risk of fatigue in the most sensitive part thereof, i.e., the front mouth end, being minimized, but also as a consequence of an optimum amount of material being maintained in the same.

BRIEF DESCRIPTION OF THE APPENDED DRAWINGS

Figure 2:
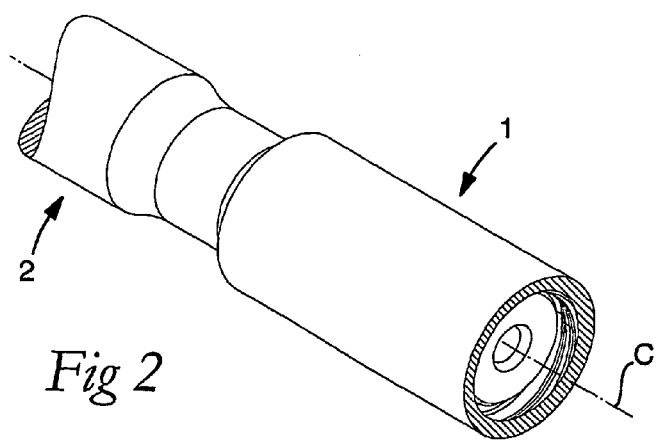
Figure 3:
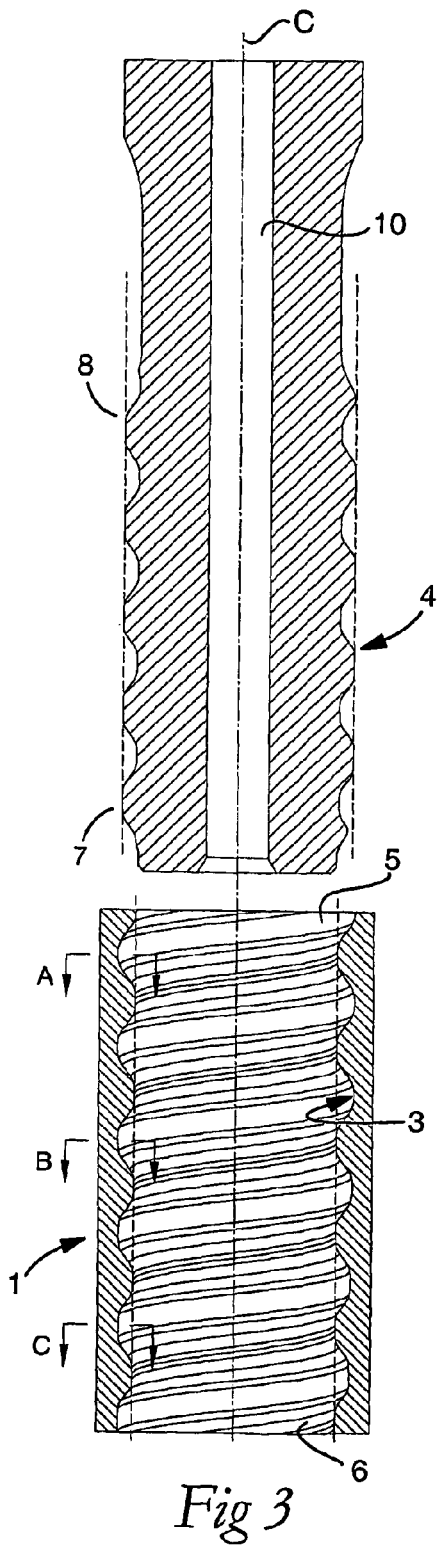
Figure 4A:
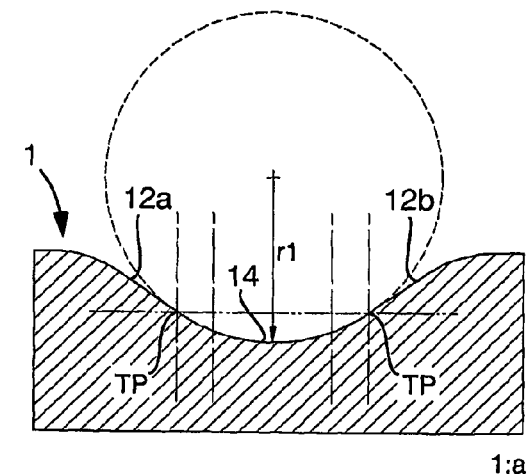
Figure 4B:
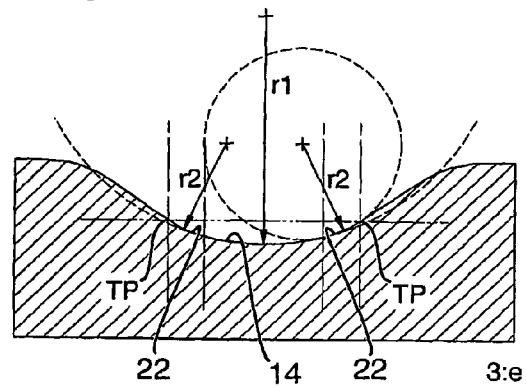
Figure 4C:
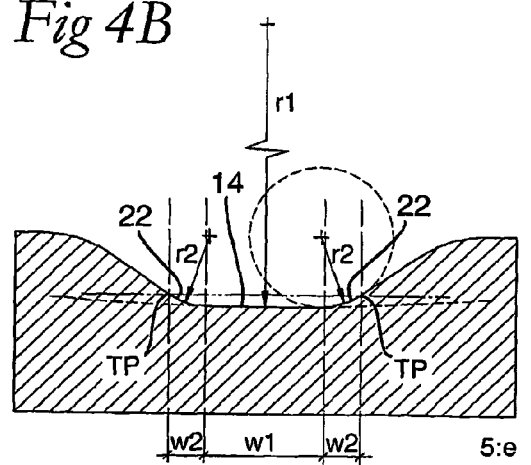
Figure 7:
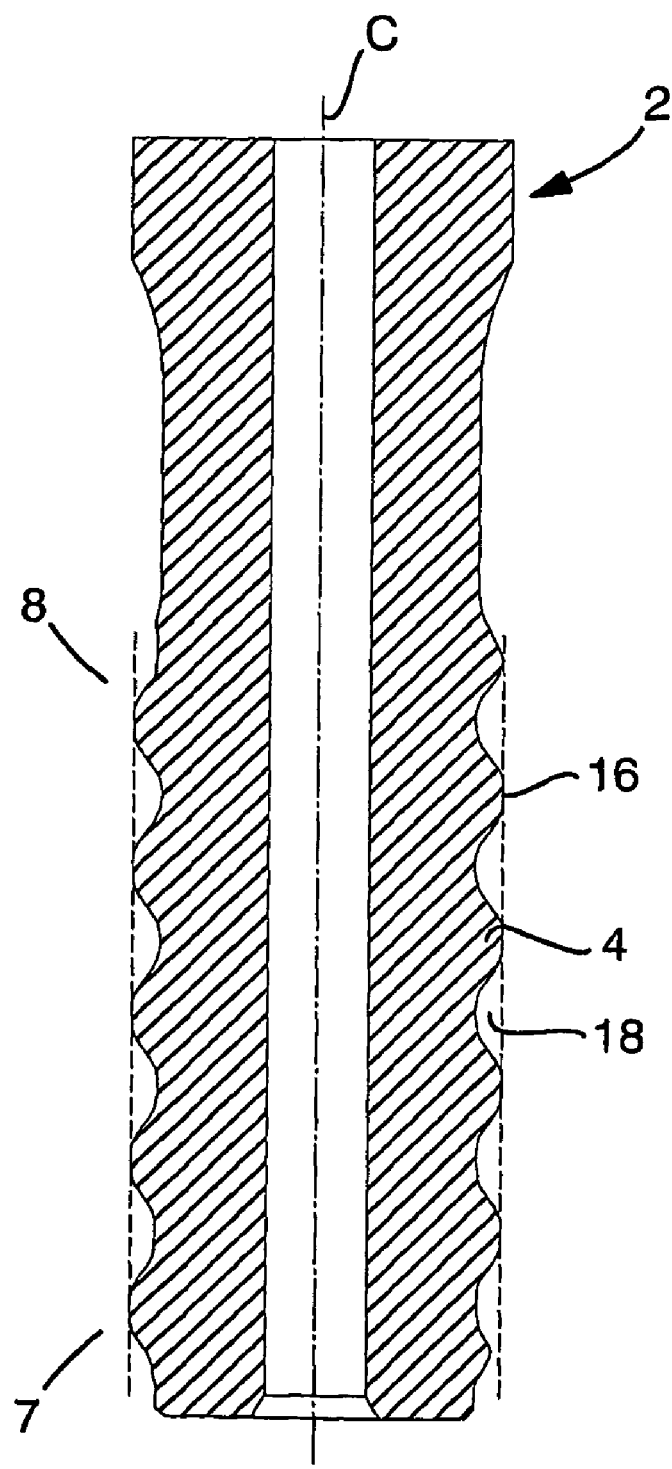

In the drawings:

FIG. 1 is an exploded view in perspective showing two parts or components included in a rock-drilling equipment, viz. a male part and a female part, both of which are shown schematically in a sectioned state, FIG. 2 is a perspective view showing the male part coupled to the female part, FIG. 3 is an exploded view in longitudinal section, which illustrates the male part and an external trapezoidal thread on the same, as well as the female part and an internal trapezoidal thread in the same, FIGS. 4A-C are a series of enlarged detailed sections showing the profile shape of the female thread in the cross-sections A, B and C in FIG. 3, FIG. 5 is an enlarged longitudinal section showing parts of the female and male threads in engagement with each other, FIG. 6 is an exploded view showing the same threads separated from each other, and FIG. 7 is a longitudinal section through a male part formed with a thread according to the invention.

DETAILED DESCRIPTION OF PREFERRED EMBODIMENTS OF THE INVENTION

In FIGS. 1 and 2, a female part 1 and a male part 2 are shown, which can be coupled or connected to each other via a threaded joint, which includes an internal thread or female thread 3 inside the female part 1, as well as an external thread or male thread 4 on the male part 2. A centre axis common to the two parts is designated C. The female thread 3 extends from a front end 5 (see FIG. 3) toward a rear end designated 6. The male thread 4 extends from a front end 7 toward a rear end 8. In the example, the front end 7 of the male thread 4 is shown situated in the immediate vicinity of the front end of the male part such as this is represented by an end surface 9 in which a flush duct 10 opens. However, it is also feasible to form a, for example cylindrical, guide surface between the thread and the end surface 9. In an analogous way, the female thread 3 may start either in the immediate vicinity of the mouth end of the female part 1, or a distance into the female part.

It should be emphasized that the female part 1 as well as the male part 2 are shown schematically in a sectioned state in FIGS. 1 and 2. In practice, the sleeve-like female part may be included in a connector or coupling sleeve, a reduction sleeve or drill bit. The only thing of importance is that the female part includes a hollow space having an internal thread. Each one of the threads 3, 4 consists of trapezoidal threads, which have a cylindrical basic shape in the example.

Reference is now made to FIGS. 3-6, which in detail illustrate the threaded joint according to the invention. The normal drilling direction is downward in FIG. 3.

In FIG. 6, it is shown that the female thread 3 consists of a thread ridge, which is delimited by a top 11 (or crest) and two flanks 12a, 12b. A groove 13 having a bottom 14 (or root) runs between two tops 11. The flanks 12a, 12b transform into the top 11 via convex radius transitions 15. In a way typical of each thread, the thread ridge 3 extends helically a plurality of turns (e.g., three or more) between the opposite ends thereof.

In an analogous way, the male thread 4 has the shape of helix thread ridge, which is delimited by a top 16 (or crest) and two flanks 17a, 17b. A groove 18 having a bottom 19 (or root) runs between two tops 16. Also in this case, the flanks 17a, 17b transform into the top 16 via convex radius transitions 20. Simultaneously, the surface of the bottom 19 of the groove transforms into the flanks via concave radius transitions 21.

In the example shown, the invention is only applied to the female thread 3, while the male thread 4 has a conventional trapezoidal profile so far that not only the top 16 but also the groove bottom 19 is in the form of cylinder surfaces (generated by straight generatrices parallel with the centre axis C).

In the example, the flank angles amount to 55° (the double flank angle=110°. Furthermore, the bottom 19 of the male thread 4 defines a diameter that is somewhat smaller than the diameter of the top 11 of the female thread 3. In such a way, a narrow gap is formed between the surfaces 11 and 19, as is seen in FIG. 5. Furthermore, the convex radius transitions 15 between the top surface 11 and the flanks 12a, 12b have a radius that is somewhat larger than the concave radius transitions 21 between the groove bottom 19 of the male thread and the adjacent flanks 17a, 17b. This means that the contact between the two cooperating threads is strictly limited to flank contact. More precisely, the contact during operation is limited to a contact between the pressing flanks 12a, 17a (see FIG. 5), while the pulling flanks 12b, 17b essentially are only active when detaching the parts from each other.

As far as the shown threaded joint has been described hitherto, the same is in all essentials previously known.

To make the general idea of the invention clear, reference is made now to FIGS. 3 and 4, of which FIG. 3 shows, on one hand, that the male thread 4 consists of a genuine trapezoidal thread having an essentially identical profile shape along the entire length of the thread, and on the other hand that the female thread 3 consists of a trapezoidal thread, the profile shape of which has been modified in accordance with the invention. More precisely, the female thread has been modified in the groove bottom, while the profile shape characteristic for trapezoidal threads is maintained in the top and flanks of the thread ridge.

In FIGS. 4A-C, there is illustrated the successive alteration of the profile shape of the groove 13 that characterizes the invention, the different cross-sections A, B and C, respectively, being taken along the first, third and fifth turns of the female thread. In the example, the profile alteration is effected from a so-called full radius profile in the cross-section A to a genuine trapezoidal profile in the cross-section C. Thus, in the last-mentioned cross-section, the groove bottom 14 consists of a cylinder surface that is thought to be generated by a rectilinear generatrix and that has a width (or axial extension) designated W1. This cylinder surface 14 transforms into the two flanks 12a, 12b via radius transitions 22, the radii of which are equally large and designated r2. In the same way as the cylinder surface 14, the radius transitions 22 have a certain width designated W2.

In the cross-section A, the groove bottom 14 consists of an arc line included in an imaginary circle, which has the radius r1 and which touches the flanks 12a, 12b in the tangential points TP. Thus, in exactly this cross-section, the groove bottom of the thread has the same profile shape as the female threads shown in U.S. Pat. Nos. 4,040,756 and 6,196,598.

At a convenient axial distance from the cross-section A, the modification of the profile shape may start. In the cross-section B, the groove bottom 14 having the width W1 has been given a larger radius r1 than in the cross-section A, at the same time as the forming of concave radius transitions 22 having the width W2 and a reduced radius r2 has started. This profile alteration proceeds successively toward the rear end of the thread, in order to, in the cross-section C, finish with the radius r1 being infinitely large at the same time as the radii r2 of the radius transitions 22 are minimal. In other words, the radius r1 of the groove bottom 14 increases from being minimal in the front cross-section A to becoming infinitely large in the rear cross-section C, at the same time as the radii r2 of the radius transitions 22 in the converse way decreases from a greatest value in the cross-section A to a smallest value in the cross-section C.

The fundamental advantage of the threaded joint according to the invention is that the problem with stress concentrations in sharply angled or narrow radius transitions is solved without for that reason unnecessarily weakening the female part by excessive material reduction. In the area where the female part is subjected to large bending loads, viz. in the vicinity of the front mouth end, accordingly no radius transitions at all need to be formed. Thus, the forming of radius transitions can start in the area where these are harmless, i.e., a convenient number of turns (or parts of a turn) behind the mouth end.

Even if the invention is particularly advantageous in the female parts of the rock-drilling equipment, the same may also be applied to the external threads included in male parts. Such an embodiment is clearly shown in FIG. 7, from which it is seen that all thread tops 16 touch a common, imaginary cylinder (in the same way as the thread tops 11 of the female thread in the preceding example) at the same time as the depth and shape of the thread groove varies in axially spaced-apart cross-sections. However, in this case, the groove bottom has its smallest depth (or rise) closest to the front end 9 of the male part 2 and its maximal depth at the rear end 8 of the thread. In other words, the radius of the proper groove bottom is reduced in the backward direction along the male part at the same time as the radii of the radius transitions are increased. Suitably—however not necessarily—the groove bottom of the thread may have genuine trapezoidal profile shape at the front end and full radius profile at the rear end.

In practice, the above-mentioned female and male parts may be manufactured from steel and the threads are formed by turning, more precisely by means of the modern turning technique based on moderate longitudinal feed of a programme-controlled tool that simultaneously is cross-fed by fast, intermittent motions in the radial direction.

The invention is not limited only to the embodiments described above and shown in the drawings. Thus, the described alteration of the profile shape of the groove bottom may start and stop in arbitrary cross-sections along the thread. Neither needs the groove bottom have full radius profile at one end thereof and trapezoidal profile at the other end thereof, provided that the alterations of the bottom and radius transitions is effected in the way described above. Furthermore, the invention may be applied to threads, the two flanks of which are not equally wide, such as has been shown in the examples. Thus, the pressing flank of at least one of the threads could be given a larger width than the pulling flank in the way disclosed in U.S. Pat. No. 4,040,756. Naturally, the invention is also applicable to threads having double entrances, and to threads having a conical basic shape instead of a cylindrical one.

The disclosures in Swedish patent application No. 0701371-7, from which this application claims priority, are incorporated herein by reference.

The invention claimed is:

1. Rock-drilling equipment comprising a female part and a male part, which are connectable with each other via a threaded joint in which an internal trapezoidal thread in the female part and an external trapezoidal thread on the male part are included, each one of the threads being in the form of a helix thread ridge, which is delimited by a top and two flanks, a groove, having a bottom, running between two tops, and which thread ridge extends a plurality of turns between front and rear ends of the rock-drilling equipment, the individual thread top touching an imaginary cylinder or cone concentric with a centre axis, wherein the groove bottom of at least one of the threads has a concave and partially circular cross-section shape along at least a part of the extension of the groove, and transforms into the flanks via concave radius transitions, the radii of which decrease in the direction axially from one end of the thread ridge toward the other one, at the same time as the radius of the groove bottom increases in the same direction.

2. Rock-drilling equipment according to claim 1, wherein the individual flank has a uniform width along the entire extension thereof.

3. Rock-drilling equipment according to claim 2, wherein the two flanks are equally wide.

4. Rock-drilling equipment according to claim 1, wherein, in an arbitrary cross-section along the extension of the thread, the radii of the groove bottom and of the radius transitions are equally large while forming a full radius profile.

5. Rock-drilling equipment according to claim 1, wherein, in an arbitrary cross-section along the extension of the thread, the radii of the radius transitions are minimal and the radius of the groove bottom is infinitely large.

6. Rock-drilling equipment according to claim 1, wherein the radius of the groove bottom is minimal in an arbitrary cross-section and increases uniformly toward another cross-section, at the same time as the radii of the radius transitions decrease uniformly in the same direction.

7. Female part for rock-drilling equipments, comprising an internal trapezoidal thread in the form of a helix thread ridge, which is delimited by a top and two flanks, a groove, having a bottom, running between two tops, and which thread ridge extends a plurality of turns between a front end and a rear end, said top touching an imaginary cylinder or cone that is concentric with a centre axis of the female part, wherein the bottom of the groove has a concave and partially circular cross-section shape along at least a part of the extension of the groove, and trans-forms into the flanks via concave radius transitions, the radii of which decrease in the direction from the front end of the thread toward the rear one, at the same time as the radius of the groove bottom increases in the same direction.

8. Female part according to claim 7, wherein the individual flank has a uniform width along the entire extension thereof.

9. Female part according to claim 8, wherein the two flanks are equally wide.

10. Female part according to claim 7, wherein, in a cross-section situated closest to the front end, the radii of the groove bottom and of the radius transitions are equally large while forming a full radius profile.

11. Female part according to claim 7, wherein, in a cross-section in the vicinity of the rear end of the thread, the radii of the radius transitions are minimal and the radius of the groove bottom is infinitely large.

12. Female part according to claim 7, wherein the radius of the groove bottom is minimal at the front end of the thread and increases uniformly toward the rear end thereof at the same time as the radii of the radius transitions decrease uniformly in the same direction.

13. Male part for rock-drilling equipments, comprising an external trapezoidal thread in the form of a helix thread ridge, which is delimited by a top and two flanks, a groove, having a bottom, running between two tops, and which thread ridge extends a plurality of turns between a front end of the male part and a rear end, said top touching an imaginary cylinder or cone that is concentric with a centre axis of the male part, wherein the bottom of the groove has a concave and partially circular cross-section shape along at least a part of the extension of the groove, and trans-forms into the flanks via concave radius transitions, the radii of which increase in the direction from the front end of the thread toward the rear one, at the same time as the radius of the groove bottom decreases in the same direction.

* * * * *